Oct. 23, 1928.  1,688,810
L. HEMMELER
MAGNETO ELECTRIC LIGHTING MACHINE FOR CYCLES AND MOTOR CYCLES
Filed May 6, 1927
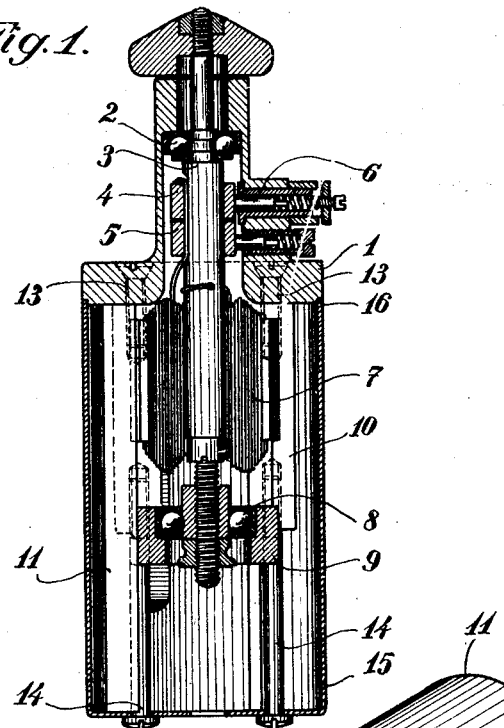
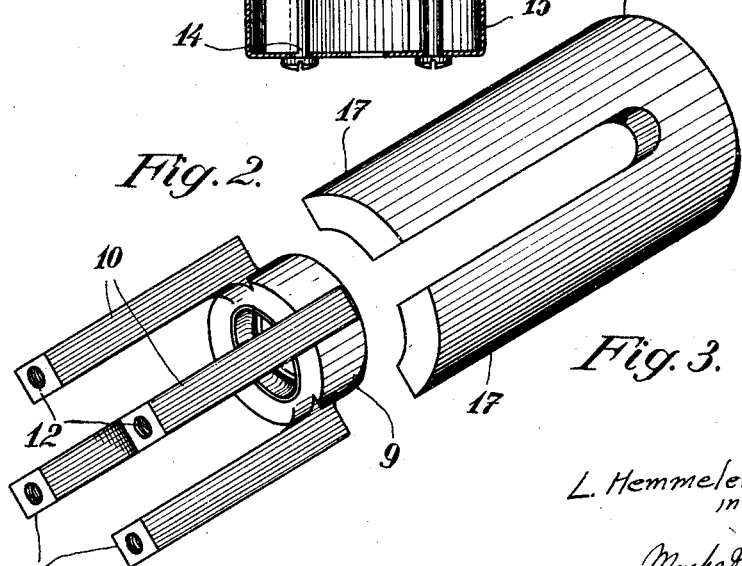
L. Hemmeler
INVENTOR Patented Oct. 23, 1928.

1,688,810

UNITED STATES PATENT OFFICE.

LOUIS HEMMELER, OF BIENNE, SWITZERLAND.

MAGNETO-ELECTRIC-LIGHTING MACHINE FOR CYCLES AND MOTOR CYCLES.

Application filed May 6, 1927, Serial No. 189,408, and in Switzerland May 10, 1926.

Generally the magnets in the magneto-electric lighting machines for cycles and motor cycles and especially in the machines of the larger pattern are maintained in place by means of two concentrical extensions of the rotor-shaft. One of these extensions is made of non-magnetic metal and limits exactly the distance between the rotor and the magnets and this arrangement necessitates an inner machining of the magnets and influences greatly the manufacturing costs of the machine and diminishes also the electric qualities of the same.

In the machine according to the present invention the magnets are maintained in equilibrium on an annular support disposed coaxially with the rotor shaft by means of an exterior shell which bears on the magnets at the ends opposite of their poles and maintains the same at the required distance from the rotor. Preferably this shell forms also the outer casing of the magneto.

In the annexed drawing, a working form of a magneto-electric machine is shown as an example according to the present invention.

Fig. 1 is an axial section and

Fig. 2 a view of the cylindrical support mentioned in the above and employed in this machine.

Fig. 3 shows one of the magnets.

In a lengthening of the bush-shaped shield 1 of the magneto shown a ball bearing 2 is lodged for supporting one end of the rotor shaft 3. This shaft carries the collector rings 4 and 5. The latter ring is connected to the machine frame while the other ring comes in contact with an insulated brush 6 whence the current is directed to one of the poles of the lamp. The rotor of the machine is marked by 7. The other end of the motor shaft is supported by a ball bearing 8 lodged within a cylindrical support 9 arranged coaxially with the rotor shaft and made out of non-magnetic metal such as aluminium or an alloy of this metal. This support is provided with the arms 10 extended sideways and parallel with the rotor shaft and serving as attaching means of the support 9 and as means for keeping the two magnet plates 11 apart from each other said plates being horse-shoe-shaped and slightly arcuated. These magnet plates, as made obvious from Figs. 2 and 3, are resting on the support 9 while one of the arms 10 separates the two shanks of each magnet. The arms have threaded holes 12 for receiving the screws 13 the heads of which are countersunk on the front side of shield 1. In this way the support 9 is solidly connected to the shield and the two bearings of the rotor are kept at a predetermined distance from each other within the lengthenings of the said support.

In the face side of support 9 opposite to the side from which the arms 10 are extended holes are drilled and threaded for receiving the long screws 14 which bear with their heads on the outside of a shell 15 made of unmagnetic metal and having an inside diameter corresponding to the diameter of the cylindrical support plus the thickness of the magnet plates. This shell rests on a shoulder 16 of the shield 1 and when in place and under the effect of the screws 14 being tightened bears on the ends opposite to those of the poles 17 and holds the magnets firmly fixed in place by pressing the same against the shield. The shell 15 prevents any pivoting movement of the magnets and maintains the required space between their poles and the rotor that is the air-gap.

The arrangement shown allows to employ rough magnets that is magnets which have not been machined after the hardening which machining is not to be recommended with the view of a good magnetization. It will suffice to unscrew the screws 14 and to take-off the shell with the magnets in order to have laid open the whole electrical and mechanical part of the machine.

What I claim as new is:

In an electromagnetic machine for cycles and motor cycles and in combination a shaft and a rotor fast thereto, a non-magnetic support including an annular bearing and arms extending from the same and parallel to said shaft, magnets having polar projections extending parallel to said shaft and between the arms of said support whereby rotation of said magnets is prevented, a shield containing the other bearing of the rotor shaft and supporting said non-magnetic support and an outer shell adapted to press the magnets against said shield in order to maintain the air-gap between rotor and magnets.

In testimony whereof I affix my signature.

LOUIS HEMMELER.